Sept. 12, 1967  R. D. FORTNEY  3,341,736
DAYTIME DRIVING SAFETY LIGHT SYSTEM FOR AUTOMOTIVE VEHICLES
Filed May 7, 1965  2 Sheets-Sheet 1

INVENTOR.
ROGER D. FORTNEY
BY Joseph G. Werner
John M. Winter
ATTORNEY

Sept. 12, 1967      R. D. FORTNEY      3,341,736
DAYTIME DRIVING SAFETY LIGHT SYSTEM FOR AUTOMOTIVE VEHICLES
Filed May 7, 1965      2 Sheets-Sheet 2

INVENTOR.
ROGER D. FORTNEY
BY Joseph G. Werner
John M. Winter
ATTORNEY

United States Patent Office 3,341,736
Patented Sept. 12, 1967

1

3,341,736
DAYTIME DRIVING SAFETY LIGHT SYSTEM
FOR AUTOMOTIVE VEHICLES
Roger D. Fortney, 4725 Tokay Blvd.,
Madison, Wis. 53711
Filed May 7, 1965, Ser. No. 454,067
5 Claims. (Cl. 315—82)

This invention relates generally to a daytime driving safety light system for automotive vehicles and more particularly to a headlight control circuit which may be operated by the ignition switch of the vehicle.

For years traffic safety officials have been advocating the use of headlights during daylight driving hours in an attempt to stem the alarming increase in automobile accidents and the many resulting injuries and deaths. While the use of headlights during daylight hours is generally recognized as an effective way of reducing automobile accidents, the vast majority of the general automobile-driving public has been reluctant to regularly put this safety procedure into practice. The widespread reluctance by motorists to driving with their headlights on during daylight hours stems from the fear that they will forget to turn the headlights off when they park their automobiles and, thus, run down the battery of their automobile. The irritation of a "dead" battery, resulting from having left the headlights of the automobile on, is all too well known.

In an attempt to prevent motorists from forgettting to turn off their headlights, especially during daylight hours, automobiles have been provided with systems for warning the driver, after he has turned off the ignition switch of his automobile to stop the engine, that he has left his headlights on. Red warning lights and buzzers are common devices in these systems. These warning systems generally have proven unsatisfactory and have not been widely accepted for various reasons. One reason is that these buzzers and flashing red lights are automatically actuated, not only during the daytime when needed but also at night when the driver can readily see that his lights are on. It is also known that some motorists leave their headlights on when alighting from their automobiles even with these warning devices operating.

Also in the past, so-called "running lights" have been used on automobiles. These "running lights" are small lights usually hung on the grill of the automobile and which are turned on when the motor is on and turned off when the motor is stopped. Many motorists feel that these "running lights" detract from the appearance of automobiles and therefore, their use is not widespread. Further, and more importantly, when in use these "running lights" have been found to be inffective because they are too small to be seen by oncoming motorists at a safe distance. This is especially true when used under poor visibility conditions such as in fog, haze, snow and the like.

Accordingly, it is an object of my invention to provide a new, improved safety light system for automotive vehicles for daytime driving.

Another object of my invention is to provide a safety light system for automobiles or the like, which utilizes the headlights of the automobile, and if desired, the taillights, and permits the lights to be controlled by the ignition switch of the automobile so that the lights may automatically be turned off by the ignition switch when the engine is turned off.

Another object of my invention is to provide a safety light system for automobiles and the like which utilizes the headlights of the automobile so as to provide a light

2 beam which can be seen at a safe distance during daylight hours by oncoming motorists.

Still another object of my invention is to provide a safety light system for automobiles and the like which utilizes the taillights of an automobile so as to provide a rear safety light for motorists approaching from the rear.

A further object of my invention is to provide a daytime driving safety light system for automobiles and the like which does not alter the exterior appearance of the automobile in any way and, thus, does not detract from the appearance of the automobile.

A still further object of my invention is to provide a safety light system for automobiles and the like which utilizes the headlights of the automobile and, yet, permits normal operation of the headlights.

Further objects, features and advantages of my invention will be apparent from the following detailed description taken in conjunction with the accompanying drawings, showing several embodiments exemplifying the principles of my invention:

Figure 1:
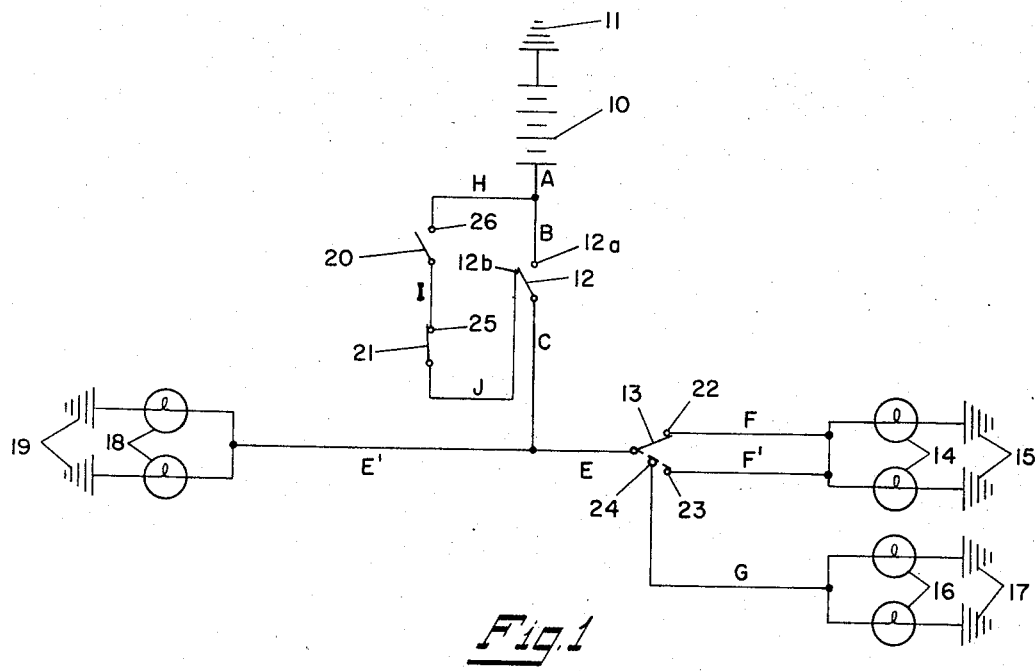
FIG. 1 is a schematic circuit diagram showing an embodiment of my safety light system for automotive vehicles.

Referring now more particularly to the drawings, FIG. 1 shows a portion of a lighting system of an automotive vehicle, including a battery 10 grounded at 11, a double-throw headlight switch 12 having first and second contact terminals, a beam selector switch or dimmer switch 13, a pair of low-beam headlights 14 grounded at 15, a pair of highbeam headlights 16 grounded at 17, and a pair of taillights 18 grounded at 19. Also shown in FIG. 1 is an ignition switch 20 which is preferably of the conventional key-operated type, and a safety light switch 21 connected in series with ignition switch 20. The ignition switch 20 and safety light switch 21 are connected in parallel with the second contact terminal of headlight switch 12.

My safety light system does not alter the normal operation of the headlights. The headlights may be turned on by closing the arm of headlight switch 12 against terminal 12a for supplying power to the headlights from battery 10 through line ABCE. Depending upon the position of arm of dimmer switch 13, power may be supplied to the low-beam headlights 14 through contact terminal 22 and line F, as shown in full lines in FIG. 1. When the arm of dimmer switch 13 is in the position shown by broken lines in FIG. 1, that is, in engagement with contact terminals 23 and 24, power is supplied to the low-beam headlights 14 and the high-beam headlights via lines $F^1$ and G, respectively. Power is supplied to taillights 18 through line $ABCE^1$. The opening or closing of ignition switch 20 and safety light switch 21 will not alter the operation of the regular headlight and taillight system when regular light control switch 12 is closed, that is, in engagement with terminal 12a.

To use my safety light system during daylight hours, the circuit connection between lines B and C is left open, that is headlight switch 12 is closed against second contact terminal 12b and safety light switch 21 is closed against contact terminal 25. Thus, when the ignition switch 20 is closed against contact terminal 26 power is supplied to the headlights from battery 10 via line AHIJCE. The dimmer switch 24 controls whether the low-beam headlights will be on alone or whether the low-beam and high-beam headlights will be on together, as described hereinbefore. It is apparent that when the automobile is parked and ignition switch 20 is turned off, the headlights will also be turned off since the opening of ignition switch 20 interrupts circuit AHIJCE even though safety light switch 21 remains closed. Thus, it is apparent that the headlights will not be drawing power from battery 10 even though the safety light switch 21 remains closed. When the ignition switch 20 is again closed to start the engine of the automobile, the headlights will automatically be turned on for safe daytime driving.

Figure 2:
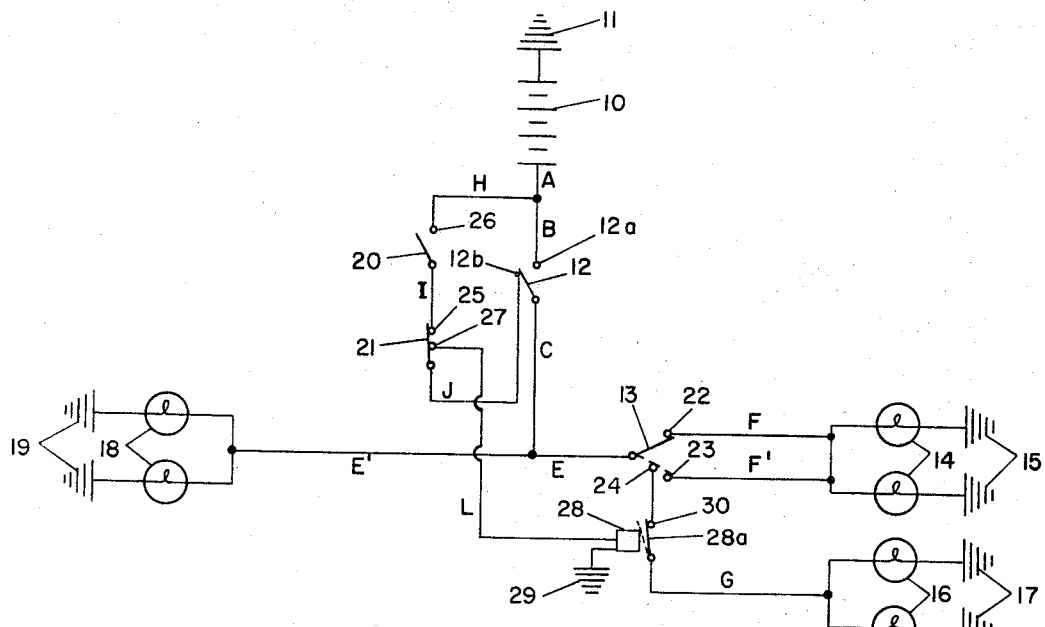
FIG. 2 is a schematic circuit diagram of another embodiment of my safety light system for automotive vehicles employing the low beam headlights of the vehicle.

FIG. 2 shows a modified form of my invention wherein the operation of safety light switch 21 will only operate the low-beam headlights 14 regardless of the position of the arm of dimmer switch 13. In this modified form, safety switch 21 is provided with an additional contact terminal such as 27. A normally closed relay switch 28 which is grounded at 29 is provided in the high-beam line G. The switch arm 28a of relay switch 28 is normally closed against contact 30 in high-beam line G so that when the headlights are operated by closing the arm of headlight switch 12 against terminal 12a and the arm of dimmer switch 13 is in its broken line position shown in FIG. 2, that is, against contact terminals 23 and 24, power will be supplied to both the low-beam headlights 14 and the high-beam headlights 16. When the headlights are operated by closing the arm of the headlight switch 12 against terminal 12a and the arm of dimmer switch 13 is in its full line position shown in FIG. 2, that is, against contact 22, power will be supplied only to the low-beam headlights 14. However, when using the daylight safety switch 21 while the double-throw headlight switch 12 is closed against terminal 12b, as shown in FIG. 2, when the ignition switch 20 is closed power will be supplied to relay 28 via line AHIL and relay switch arm 28a will swing to its broken line position shown in FIG. 2 and break contact terminal 30. Thus, if the arm of dimmer switch 13 is in its broken line position as shown in FIG. 2, that is, engaging contacts 23 and 24, power will be supplied only to the low-beam headlights 14 since the power to the high-beam headlights will be interrupted in line G by open relay 28. If the arm of dimmer switch 13 is in its full line position as shown in FIG. 2, that is, against contact terminal 22 only the low-beam headlights would be turned on. Thus, in the form shown in FIG. 2 the safety light system will always only operate the low-beam headlights 14 and the taillights 18.

Figure 3:
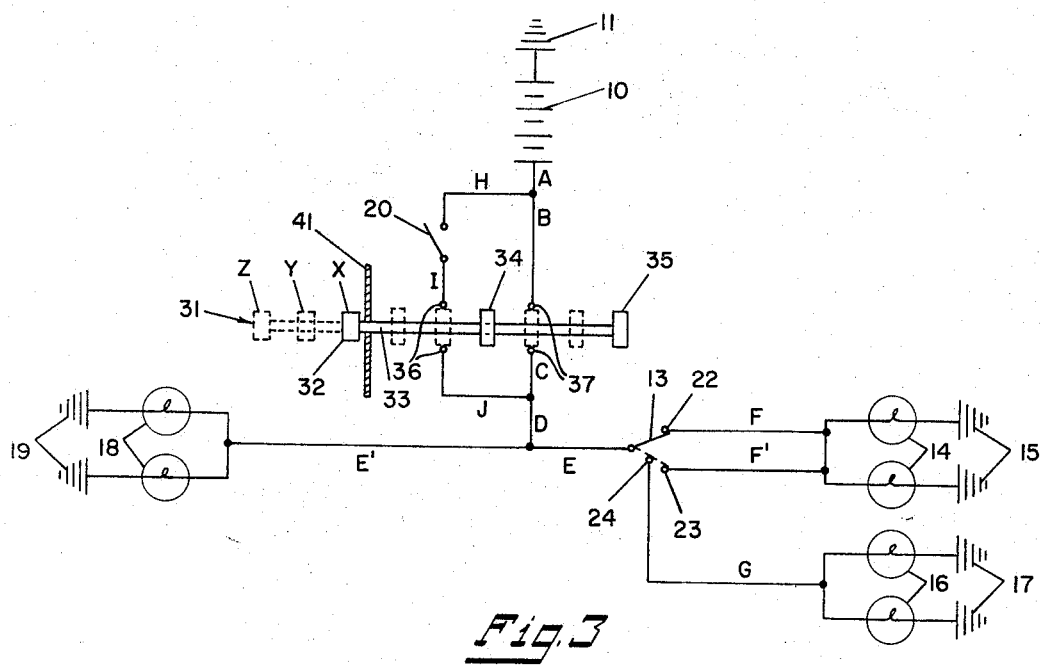
FIG. 3 is a schematic circuit diagram of another embodiment of my safety light system employing a single control knob for the safety light system and the regular operation of the headlights.

As shown in FIG. 3 my safety light system may be operated in connection with the regular lighting system of an automotive vehicle by a single push-pull switch shown at 31 on the dashboard 41 of the vehicle. The switch has a knob 32 and a stem 33 which carries and insulates contact blades 34 and 35 from each other. The switch 31 is movable to three positions as shown at X, Y, and Z in FIG. 3. In its full line position shown at X, both contact blades 34 and 35 are out of contact with the two pairs of contact terminals 36 and 37. When switch 31 is in position X the headlights will be off.

When the switch 31 is pulled out to position Y shown in broken lines in FIG. 3 contact blade 34 will connect the pair of contact terminals 36 and contact blade 35 will still be out of contact with all contact terminals. In position Y, which is the safety light on position, power will be supplied to the headlights via line AHIJDE when ignition switch 20 is closed and the lights will be turned off when ignition switch 20 is opened.

In the third position Z, contact blade 34 is out of engagement with contact terminals 36 and contact blade 35 connects the pair of terminals 37 whereby, the headlights are operated in the conventional manner, through line ABCDE. When the switch 31 is in position Z, the operation of the headlights cannot be controlled by ignition switch 20.

Figure 4:
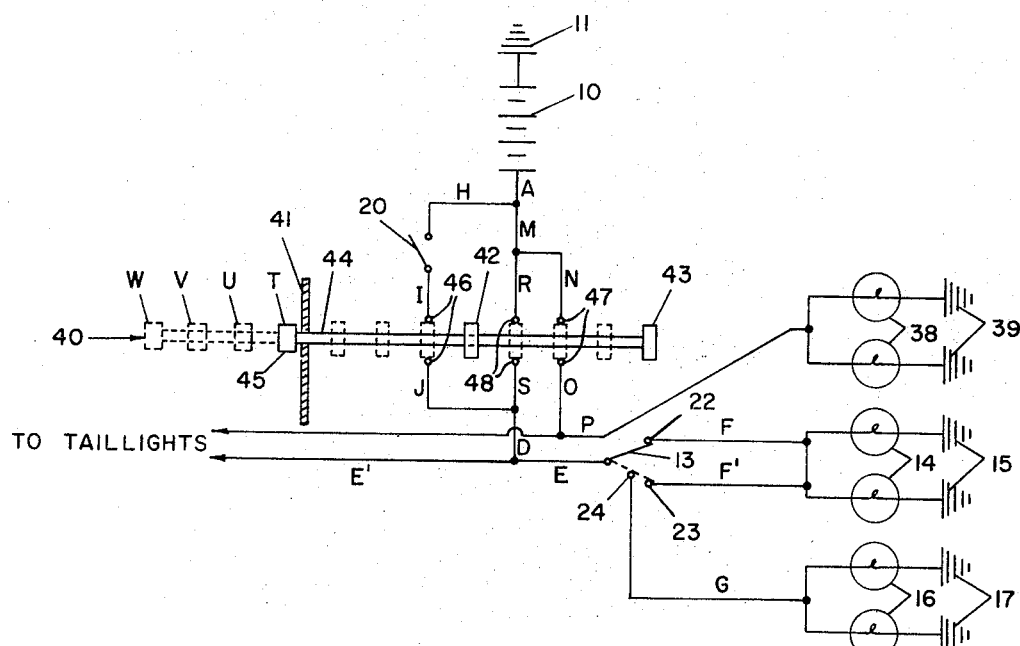
FIG. 4 is a schematic circuit diagram of another embodiment of my safety light system.

FIG. 4 shows a form of my invention as may be used in connection with the lighting system on an automotive vehicle which includes a pair of high-beam headlights 16 grounded at 17, a pair of low-beam headlights 14 grounded at 15, a pair of parking lights 38 grounded at 39 and a pair of taillights (not shown). My safety light system may be provided with a four-position light switch 40 which may be mounted on the dash 41 of an automobile or the like in the conventional manner. In this form, all of the lights on the automobile would be off when the switch 40 is in position T, since contact blades 42 and 43 mounted on stem 44 would be out of contact with all of the terminals.

The safety light system would be actuated by grasping knob 45 of switch 40 and pulling it outwardly to position U whereby contact blade 42 would connect the pair of contact terminals 46 as shown in broken lines in FIG. 4 and blade 43 would be out of engagement with all contact terminals. Thus, in position U power would be supplied from battery 10 to the headlights via line AHIJDE and line F or $F^1$ and G depending upon the position of the arm of dimmer switch 13.

When the switch 40 is pulled out to position V shown in FIG. 4 contact blade 42 would be out of contact with terminals 46 and contact blade 43 would connect the pair of contact terminals 47 for supplying power from battery 10 to parking lights 38 in the conventional manner via line AMNOP. The power would be supplied to the taillights from battery 10 via line AMNOQ when switch 40 is in position V.

When switch 40 is pulled out to position W as shown in broken lines in FIG. 4, contact blade 42 is out of contact with all contact terminals and contact blade 43 connects the pair of contact terminals 48. Thus, in position W, power is supplied from battery 10 to the headlights via line AMRSDE and line F or $F^1$ and G depending upon the position of the arm of dimmer switch 13. When switch 40 is in position W, power is supplied to the taillights via line AMRSDE.

It is understood that the system shown in FIG. 4 could be altered to eliminate line N if the upper contact terminals of pairs of terminals 47 and 48 are replaced by a single elongated contact terminal which could be engaged by blade 43 when switch 40 was in positions V and W. There would still be three pairs of contact terminals but the elongated contact terminal would be common to two pairs.

It is further understood that the system shown in FIG. 2, wherein the safety light switch will only operate the low-beam headlights regardless of the position of the arm of dimmer switch 13, may also be employed with the systems shown in FIGS. 3 and 4.

It is an important feature of my invention that the normal operation of the headlights, taillights and parking lights of the automotive vehicle is not affected by my safety light system. Thus, where two separate switches such as the regular switch and the safety light switch are provided as shown in FIG. 1, the regular headlight switch may be operated to turn the lights off or on regardless of the position of the ignition switch and the safety light switch. In the form shown in FIGS. 3 and 4, the operation of the multiposition light switch is not affected by the position of the ignition switch.

It is understood that my invention is not confined to the particular construction or arrangement of parts herein illustrated and described, but embraces all such modified forms thereof as may come within the scope of the following claims.

I claim:

1. A safety light system for a motor vehicle comprising:

(a) an ignition switch, (b) a pair of high-beam headlights,
(c) a pair of low-beam headlights,
(d) a first manually operable double-throw headlight switch having first and second contact terminals,
(e) a battery for supplying power to said headlights,
(f) a beam selector switch for selectively operating only the low-beam headlights or for operating the low-beam headlights and the high-beam headlights together,
(g) a second manually operable light switch connected in series with said ignition switch and in parallel with the second contact terminal of said first headlight switch, whereby, when said first headlight switch is closed against its said second contact terminal and said second light switch is closed the operation of said headlights may be controlled by said ignition switch,
(h) a normally closed relay switch which is opened when energized by the closing of said second light switch for interrupting power to said high-beam headlights while said second light switch is closed regardless of the position of the beam selector switch, and
(i) circuit connections between said battery, switches, and headlights.

2. A safety light system for a motor vehicle comprising:
(a) an ignition switch,
(b) a headlight,
(c) a battery for supplying power to said headlight, and
(d) a manually operable switch having a first pair of contact terminals and a second pair of contact terminals, said second pair of contact terminals being connected in series with said ignition switch and the series circuit of the second contact terminals and ignition switch being connected in parallel with said first pair of contact terminals, said manually operable switch having means for selectively connecting and disconnecting the contact terminals in said pairs of contact terminals, said means being movable to at least three positions wherein in one of said positions said means disconnects the contact terminals of both pairs of contact terminals, wherein in another of said positions said means connects said first pair of contact terminals for supplying power from said battery to said headlight, and wherein in another of said positions said means connects said second pair of contact terminals whereby the operation of said headlight may be controlled by said ignition switch.

3. A safety light system for a motor vehicle comprising:
(a) an ignition switch,
(b) a pair of high-beam headlights,
(c) a pair of low-beam headlights,
(d) a battery for supplying power to said headlights,
(e) a beam selector switch for selectively operating only the low-beam headlights or for operating the low-beam headlights and the high-beam headlights together,
(f) a manually operable switch having a first pair of contact terminals and a second pair of contact terminals, said second pair of contact terminals being connected in series with said ignition switch and the series circuit of the second contact terminals and the ignition switch being connected in parallel with said first pair of contact terminals, said manually operable switch having means for selectively connecting and disconnecting the contact terminals in said pairs of contact terminals, said means being movable to at least three positions, wherein in one of said positions said means disconnects the contact terminals of both pairs of contact terminals, wherein in another of said positions said means connects said first pair of contact terminals for supplying power from said battery to said headlights, and wherein in another of said positions said means connects said second pair of contact terminals whereby the operation of said headlights may be controlled by said ignition switch, and
(g) means for interrupting power to said high-beam headlights while said manually operable switch closes said second contact terminals regardless of the position of the beam selector switch.

4. A safety light system for a motor vehicle comprising:
(a) an ignition switch,
(b) a headlight,
(c) a parking light,
(d) a battery for supplying power to said headlight and said parking light, and
(e) a manually operable light switch having a first pair of terminals connected in series with said battery and said headlight, a second pair of contact terminals connected in series with said battery and said parking light, and a third pair of contact terminals connected in series with said ignition switch and the series circuit of the third contact terminals and the ignition switch being connected in parallel with said first pair of contact terminals, said light switch having means for selectively connecting and disconnecting the contact terminals in said pairs of terminals, said means being movable to at least four positions, wherein in one of said positions said means disconnects the contact terminals of all three pairs of contact terminals, wherein in another of said positions said means connects said second pair of contact terminals to supply power from said battery to said parking light, wherein in another of said positions, said means connects said first pair of contact terminals to supply power from said battery to said headlight, and wherein in another of said positions said means connects said third pair of contact terminals whereby the operation of said headlight may be controlled by said ignition switch.

5. A safety light system for a motor vehicle comprising:
(a) an ignition switch,
(b) a pair of high-beam headlights,
(c) a pair of low-beam headlights,
(d) a pair of parking lights,
(e) a battery for supplying power to said headlights and said parking lights,
(f) a beam selector switch for selectively operating only the low-beam headlights or for operating the low-beam headlights and the high-beam headlights together,
(g) a manually operable light switch having a first pair of terminals connected in series with said battery and said headlights, a second pair of contact terminals connected in series with said battery and said parking lights, and a third pair of contact terminals connected in series with said ignition switch and the series circuit of the third contact terminals and the ignition switch being connected in parallel with said first pair of contact terminals, said light switch having means for selectively connecting and disconnecting the contact terminals in said pairs of terminals, said means being movable to at least four positions, wherein in one of said positions said means disconnects the contact terminals of all three pairs of contact terminals, wherein in another of said positions said means connects said second pair of contact terminals to supply power from said battery to said parking lights, wherein in another of said positions, said means connects said first pair of contact terminals to supply power from said battery to said headlights, and wherein in another of said positions said means connects said third pair of contact terminals whereby the operation of said headlights may be controlled by said ignition switch, and (h) means for interrupting power to said high-beam headlights while said manually operable light switch closes said third contact terminals regardless of the position of the beam selector switch.

References Cited

UNITED STATES PATENTS 3,068,378 12/1962 Bishop et al. _____ 315—77
3,262,011 7/1966 Cones _____ 315—77 X JAMES W. LAWRENCE, *Primary Examiner.*

R. JUDD, *Assistant Examiner.*